US008959583B2

(12) United States Patent
Fadida et al.

(10) Patent No.: US 8,959,583 B2
(45) Date of Patent: Feb. 17, 2015

(54) ACCESS TO VAULTED CREDENTIALS USING LOGIN COMPUTER AND MOBILE COMPUTING DEVICE

(71) Applicant: CA, Inc., Islandia, NY (US)

(72) Inventors: Itzhak Fadida, Haifa (IL); Guy Balzam, Raanana (IL); Amir Jerbi, Givatayim (IL)

(73) Assignee: CA, Inc., Islandia, NY (US)

( * ) Notice: Subject to any disclaimer, the term of this patent is extended or adjusted under 35 U.S.C. 154(b) by 130 days.

(21) Appl. No.: 13/759,282

(22) Filed: Feb. 5, 2013

(65) Prior Publication Data

US 2014/0223525 A1  Aug. 7, 2014

(51) Int. Cl.
*H04L 9/32* (2006.01)
*H04L 29/06* (2006.01)

(52) U.S. Cl.
CPC .................................. *H04L 63/083* (2013.01)
USPC ................. 726/2; 726/3; 726/4; 726/5; 726/6

(58) Field of Classification Search
USPC .................... 726/1–10, 16–21; 713/168, 170, 713/181–186
See application file for complete search history.

(56) References Cited

U.S. PATENT DOCUMENTS

| 6,668,322 | B1 * | 12/2003 | Wood et al. .................... 713/182 |
| 7,644,434 | B2 * | 1/2010 | Pollutro et al. ..................... 726/7 |
| 7,885,635 | B2 * | 2/2011 | Laursen et al. ............... 455/403 |
| 8,352,598 | B2 * | 1/2013 | Nyang et al. .................. 709/225 |
| 8,627,438 | B1 | 1/2014 | Bhimanaik | |
| 8,732,461 | B2 * | 5/2014 | Fujii et al. ...................... 713/168 |
| 2013/0167208 | A1 | 6/2013 | Shi | |
| 2013/0173915 | A1 | 7/2013 | Haulund | |
| 2014/0088983 | A1 | 3/2014 | Neff | |

* cited by examiner

*Primary Examiner* — Hosuk Song
(74) *Attorney, Agent, or Firm* — Coats & Bennett, P.L.L.C.

(57) ABSTRACT

According to an example computer-implemented method, a password management server receives an access request message from a login computer at which a resource requiring vaulted credentials has been requested. The access request message identifies the requested resource and the login computer. A session identifier (ID) is generated for enabling release of the vaulted credentials. The session ID is linked to the login computer and to the requested resource. The session ID is transmitted to the login computer. Responsive to receiving a value indicative of the session ID from a mobile computing device, the password management server transmits the vaulted credentials to the login computer or to the mobile computing device.

33 Claims, 10 Drawing Sheets

US 8,959,583 B2

ACCESS TO VAULTED CREDENTIALS USING LOGIN COMPUTER AND MOBILE COMPUTING DEVICE

TECHNICAL FIELD

The present disclosure relates to vaulted credentials, and more specifically relates to a method, apparatus and computer program product for releasing vaulted credentials from a password management server to a login computer or a mobile computing device.

BACKGROUND

Privileged Account Password Management (PAPM) systems allow users to store privileged account passwords on a password management server. Based on their permissions, users are able to obtain so-called "vaulted credentials" from the password management server. One such system is the Computer Associates "ControlMinder" product. The use of PAPM systems allows users to better control who is exposed to privileged account passwords and to track down who is using a privileged account at a certain time. Thus, when a user wants to login to a machine using a privileged account, the user is asked to first check-out the privileged account password from the PAPM portal and then use the retrieved password to login to the remote machine. This has involved exposing the login credentials to the requesting user, so that the user may reenter those credentials in a given login prompt on a login computer.

SUMMARY

According to one aspect of the present disclosure, a computer-implemented method comprises receiving, at a password management server, an access request message from a login computer at which a resource requiring vaulted credentials has been requested. The access request message identifies the requested resource and the login computer. A session identifier (ID) is generated for enabling release of the vaulted credentials. The session ID is linked to the login computer and to the requested resource. The session ID is transmitted to the login computer. Responsive to receiving a value indicative of the session ID from a mobile computing device, the vaulted credentials are transmitted to the login computer or to the mobile computing device.

According to another aspect of the present disclosure, a computer-implemented method comprises transmitting an access request message from a login computer to a password management server. The access request message identifies a requested resource and the login computer. Responsive to the access request message, an access response is received from the password management server, the access response including a session identifier (ID) linked to the login computer and to the requested resource. An encoded image containing the session ID is displayed to a mobile computing device via a display of the login computer. A mobile computing device is used to read the encoded image. Vaulted credentials are received from the password management server responsive to the password management server receiving a value indicative of the session ID, decoded from the encoded image, from the mobile computing device.

According to another aspect of the present disclosure, a computer implemented method comprises reading, by a mobile computing device, an encoded image from an electronic display of a login computer, the encoded image including a session ID linking a requested resource to the login computer. The mobile computing device decodes the encoded image to obtain the session ID, and transmits a value indicative of the session ID to the password management server to release vaulted credentials for the requested resource to the login computer or to the mobile computing device.

According to another aspect of the present disclosure a computing device comprises a transceiver and a controller in a password management server. The controller is configured to receive, via the transceiver, an access request message from a login computer at which a resource requiring vaulted credentials has been requested. The access request message identifies the requested resource and the login computer. The controller is further configured to generate a session identifier (ID) for enabling release of the vaulted credentials. The session ID is linked to the login computer and to the requested resource. The controller is further configured to transmit, via the transceiver, the session ID to the login computer. Responsive to receiving, via the transceiver, a value indicative of the session ID from a mobile computing device, the controller is configured to transmit the vaulted credentials to the login computer or to the mobile computing device.

According to another aspect of the present disclosure a computing device comprises a controller in a login computer. The controller is configured to transmit an access request message from the login computer to a password management server. The access request message identifies a requested resource and the login computer. The first controller is further configured to receive, responsive to the access request message, an access response from the password management server. The access response includes a session ID linked to the login computer and to the requested resource. A display operatively connected to the login computer is configured to display an encoded image containing the session ID to a mobile computing device. The controller is further configured to receive vaulted credentials from the password management server responsive to the password management server receiving a value indicative of the session ID, decoded from the encoded image, from the mobile computing device.

According to another aspect of the present disclosure a computing device comprises a controller in a mobile computing device and a transceiver. The controller is configured to read the encoded image from an electronic display of a login computer. The encoded image includes a session ID linked to the login computer and to a requested resource. The controller is further configured to decode the encoded image to obtain the session ID. The transceiver is configured to transmit, from the mobile computing device to the password management server, a value indicative of the session ID to release vaulted credentials for the requested resource to the login computer or to the mobile computing device.

According to another aspect of the present disclosure, a computer program product comprises a computer readable storage medium having computer readable program code embodied therewith for a password management server. The computer readable program code comprises computer readable program code configured to receive, at the password management server, an access request message from a login computer at which a resource requiring vaulted credentials has been requested. The access request message identifies the requested resource and the login computer. The computer readable program code further comprises computer readable program code configured to generate a session identifier (ID) for enabling release of the vaulted credentials, the session ID being linked to the login computer and to the requested resource. The computer readable program code further comprises computer readable program code configured to transmit the session ID to the login computer; and computer readable program code configured, responsive to receiving a value indicative of the session ID from a mobile computing device, to transmit the vaulted credentials to the login computer or to the mobile computing device.

According to another aspect of the present disclosure a computer program product comprises a computer readable storage medium having computer readable program code embodied therewith for a login computer. The computer readable program code comprises computer readable program code configured to transmit an access request message from the login computer to a password management server. The access request message identifies a requested resource and the login computer. The computer readable program code further comprises computer readable program code configured to receive, responsive to the access request message, an access response from the password management server. The access response includes a session identifier (ID) linked to the login computer and to the requested resource. The computer readable program code further comprises computer readable program code configured to display an encoded image containing the session ID to a mobile computing device via a display of the login computer, and computer readable program code configured to receive vaulted credentials from the password management server responsive to the password management server receiving a value indicative of the session ID, decoded from the encoded image, from the mobile computing device.

According to another aspect of the present disclosure, a computer program product comprises a computer readable storage medium having computer readable program code embodied therewith for a mobile computing device. The computer readable program code comprises computer readable program code configured to read an encoded image from an electronic display of a login computer. The encoded image includes a session ID linked to the login computer and to a requested resource. The computer readable program code further comprises computer readable program code configured to decode the encoded image to obtain the session ID, and transmit, from the mobile computing device to the password management server, a value indicative of the session ID to release vaulted credentials for the requested resource to the login computer or to the mobile computing device.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
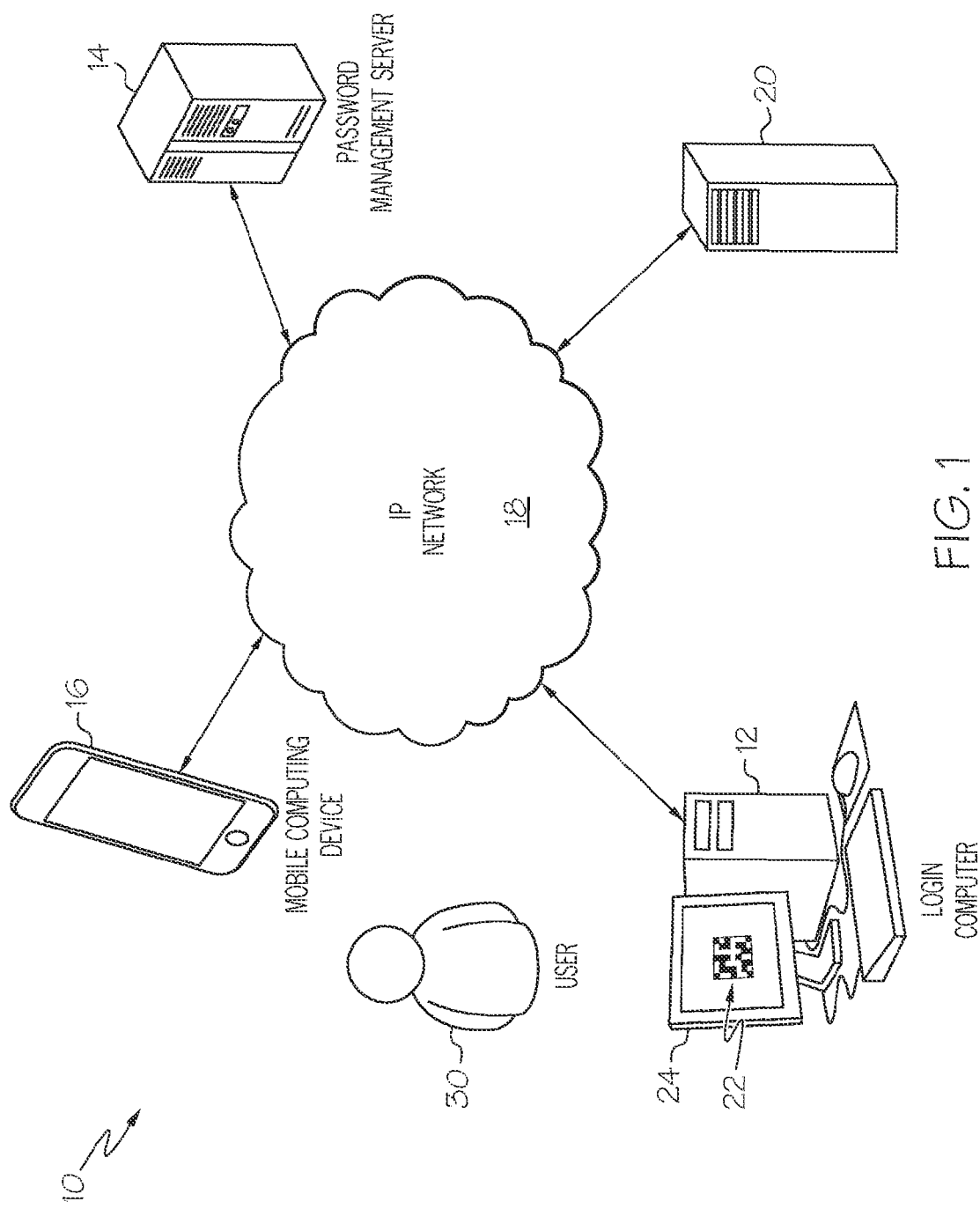
FIG. 1 is a block diagram of a communications network configured according to one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a method, apparatus and computer program product for releasing vaulted credentials for a requested resource to a login computer, by using an encoded image displayed to a mobile computing device via an electronic display of the login computer. By reading the encoded image with a mobile computing device to obtain a session ID, and sending that session ID from the mobile computing device to a password management server, a user of the login computer can obtain vaulted credentials from the password management server. In one or more embodiments this can be implemented without exposing the user to the vaulted credentials, and without the user even knowing specific identification properties of a requested resource accessible with the vaulted credentials.

Referring now to FIG. 1, a block diagram of a communications network 10 configured according to one example embodiment is illustrated. The network 10 includes a login computer 12, a password management server 14, and a mobile computing device 16 that are connected via an IP network 18, which may include a local area network (LAN) and/or a wide area network (WAN), such as the Internet. The password management server 14 stores vaulted credentials for accessing a requested resource. In one or more embodiments the requested resource is a shared account, such as an "Administrator" or "PowerUser" account that is shared among multiple users. In one or more other embodiments, the requested resource is data stored in an additional server 20 in the network 10 that is also connected via the IP network 18, such as a SQL server. As described below in greater detail, the password management server 14 communicates with the login computer 12 and mobile computing device 16 via the IP network 18 to release vaulted credentials to the login computer 12 or to the mobile computing device 16. An example login computer 12, password management server 14 and mobile computing device 16 are illustrated in greater detail in FIGS. 10-12.

Figure 2:
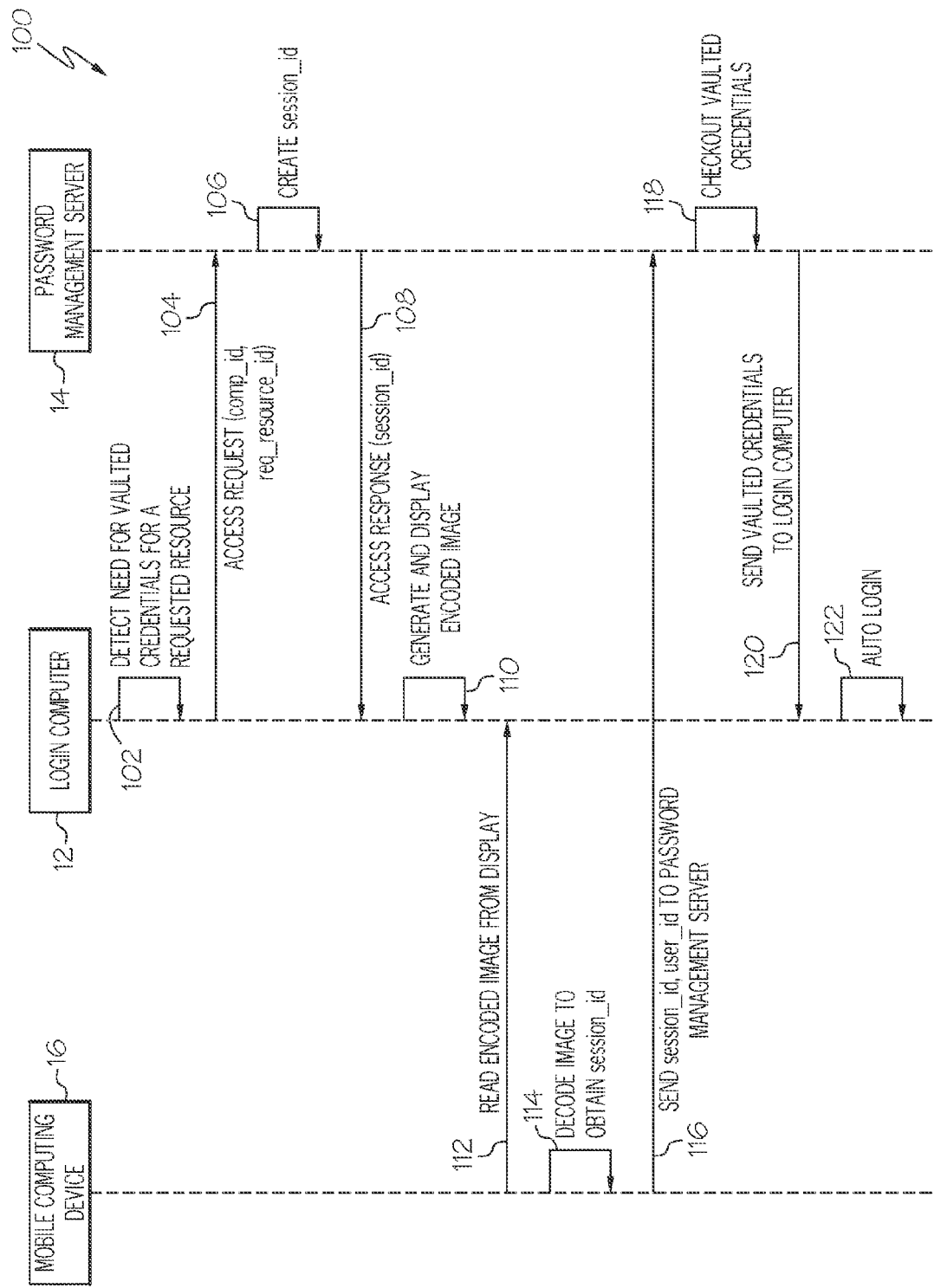
FIG. 2 is a flow diagram illustrating a method that facilitates the release of vaulted credentials to a login computer.

FIG. 2 is a signaling diagram illustrating a process 100 by which the password management server 14 communicates with the login computer 12 and the mobile computing device 16 to release vaulted credentials to the login computer 12. Referring now to FIG. 2, the login computer 12 detects a need for vaulted credentials for a requested resource (step 102). In one or more embodiments, step 102 is triggered by the user 30 indicating a desire for access to the requested resource. Based on this detection, the login computer 12 transmits an access request message to the password management server 14 that identifies the requested resource ("req_resource_id") and the login computer 14 ("comp_id") (step 104).

Upon receiving the access request message from the login computer 12, the password management server 14 generates a session ID ("session_id") for enabling release of the vaulted credentials to the login computer 12 (step 106), with the session ID being linked to the login computer 12 and to the requested resource. The password management server 14 then sends an access response to the login computer 12 that includes the session ID (step 108).

The login computer 12 generates an encoded image 22 containing the session ID, and displays that image on its electronic display 24 (step 110). The user 30 uses the mobile computing device 16 to read the encoded image 22 from the electronic display 24 (step 112), and decodes the image to obtain the session ID (step 114). The user 30 also uses the mobile computing device 16 to transmit a value indicative of the session ID, and their user ID, to the password management server 14 (step 116). In one or more embodiments the value indicative of the session ID is the actual session ID. In one or more other embodiments, the value indicative of the session ID is a value derived from the session ID. Upon receiving the session ID and user ID, the password management server 14 checks out the vaulted credentials (step 118), and transmits the credentials to the login computer 12 (step 120). The login computer may then optionally perform an automatic login to using the vaulted credentials to access the requested resource (step 122). Thus, the network 10 in one or more embodiments allows users to login with a privileged shared account (e.g., "Administrator" or "PowerUser") to a managed system (e.g., server 20) without actually being exposed to the privileged account credentials.

Figure 4:
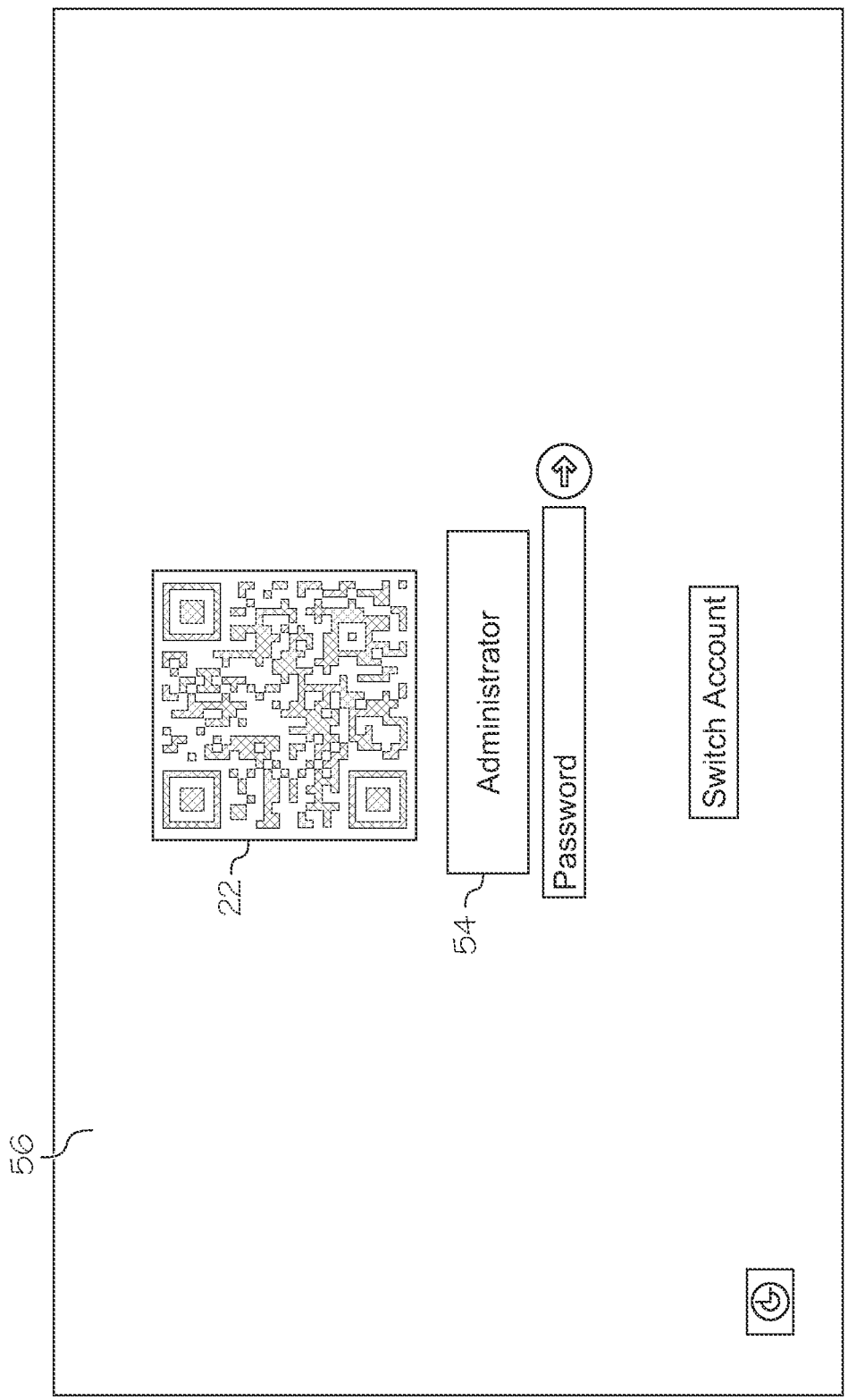
FIG. 4 illustrates an example login screen including an encoded image for releasing vaulted credentials.

In one or more embodiments, the encoded image is a Quick Response (QR) code (see, e.g., the QR code in encoded image 22 in FIG. 4), and the reading of the encoded image (step 112) corresponds to the mobile computing device 16 recording a copy of the encoded image from the electronic display 24 of the login computer 12 using a camera of the mobile computing device. The decoding of the image (step 114) then corresponds to the mobile computing device 16 decoding its recorded image of the QR code.

In one or more other embodiments, the encoded image is a bar code and the reading of the encoded image (step 112) corresponds to the mobile computing device 16 scanning the image from the electronic display 24 of the login computer 12 (e.g., using an infrared scanner). The decoding of the image (step 114) then corresponds to the mobile computing device 16 decoding the scanned bar code.

Figure 3:
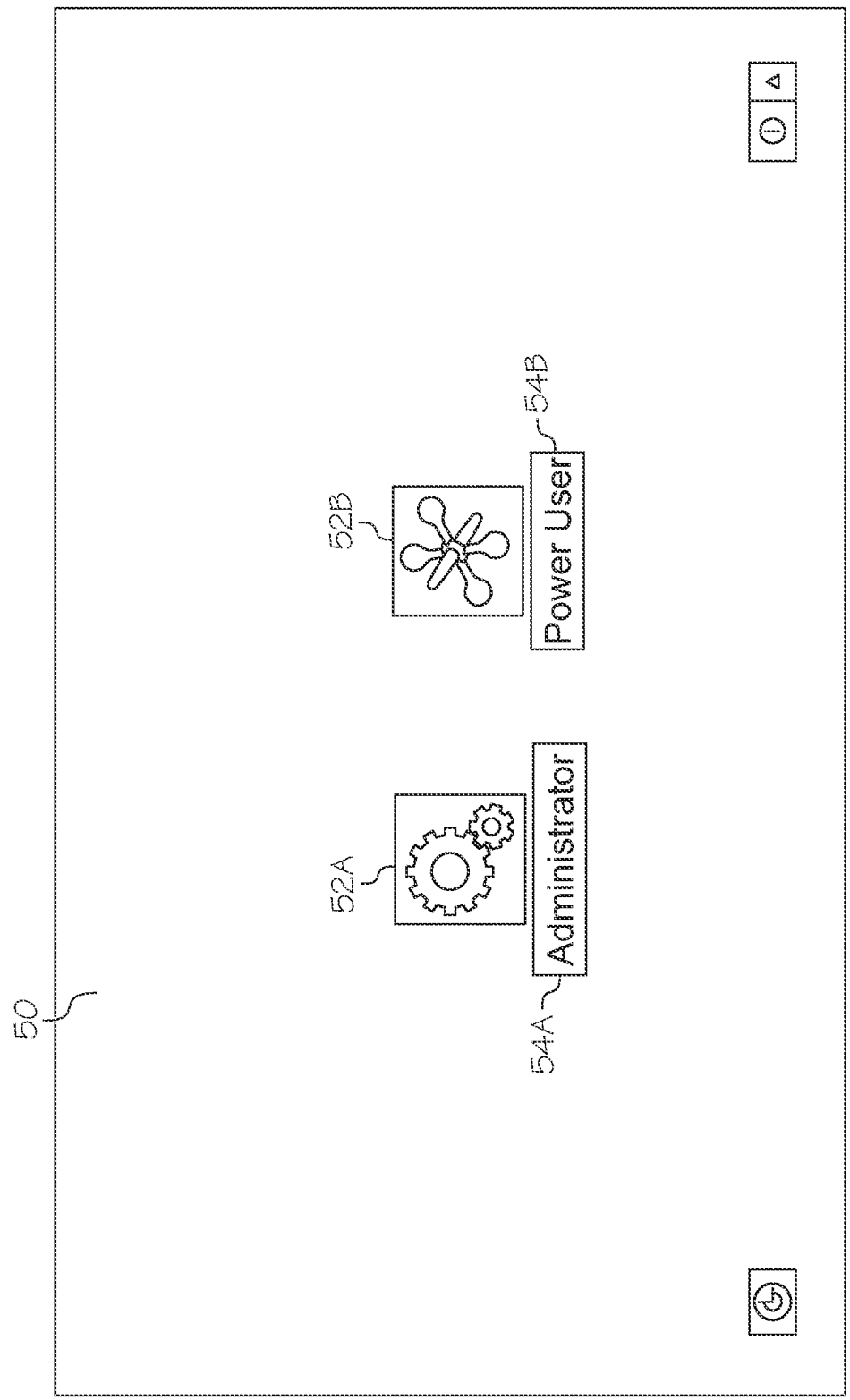
FIG. 3 illustrates an example login screen.

FIG. 3 illustrates an example login screen 50 displayed on the electronic display 24 of the login computer 12. This example login screen is for an operating system login, and includes clickable icons 52A-B for shared accounts "Administrator" and "Power User" next to labels 54A-B for those accounts. In one example embodiment incorporating this login screen, the login computer 12 detecting a need for vaulted credentials (step 102) corresponds to the user 30 clicking the "Administrator" account icon. In this embodiment, the requested resource is the shared "Administrator" account. Upon clicking the Administrator icon 52A, screen 56 is displayed (see FIG. 4) that includes an encoded image 22 including the encoded session ID from the password management server 14, and a label 54 identifying the shared account mapped to the encoded image 22 (i.e., "Administrator"). In one or more embodiments the generation of the encoded image is handled by an agent running as a background process on the login computer 12.

Figure 5:
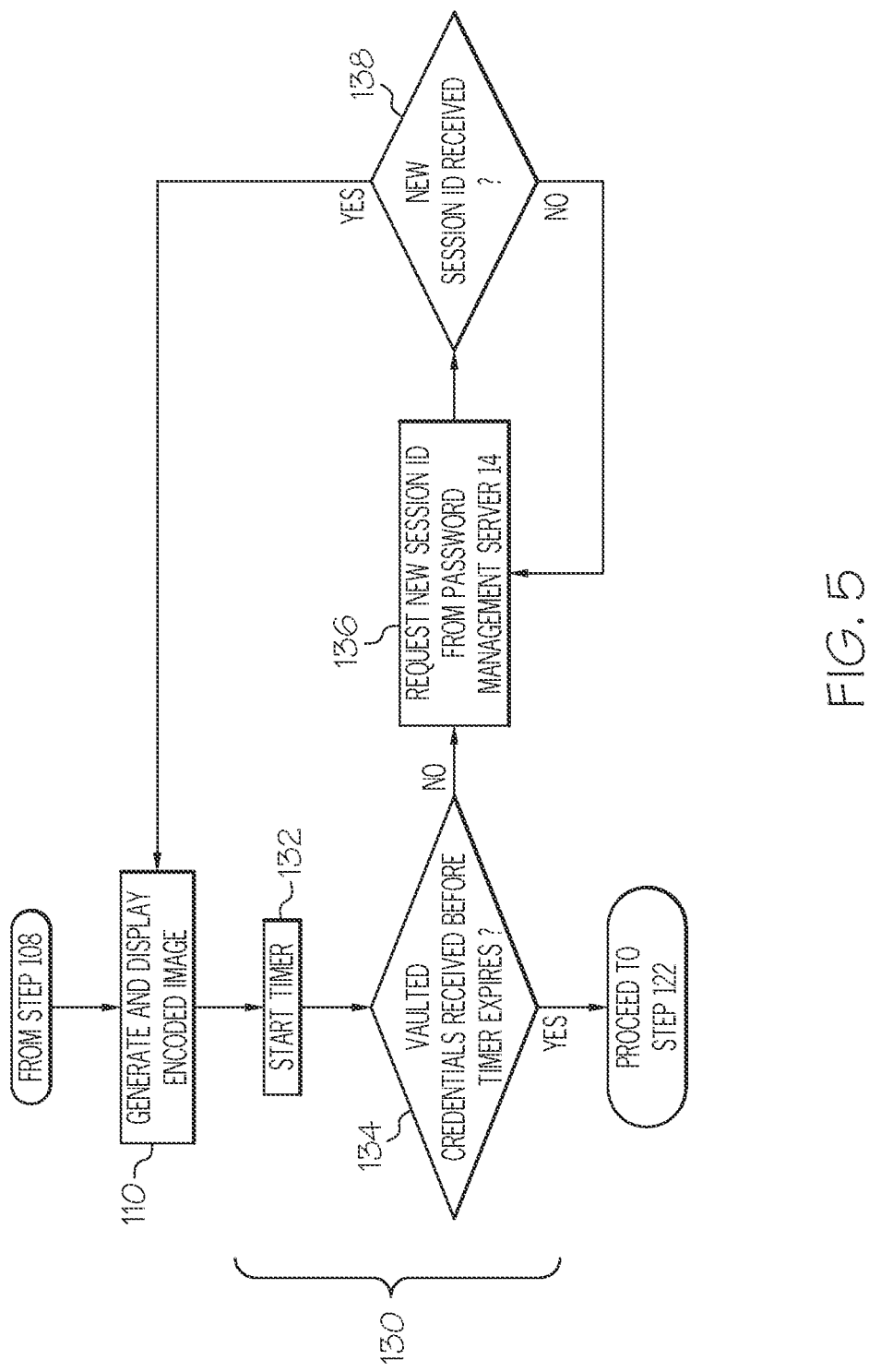
FIG. 5 illustrates a procedure for encoded image regeneration.

As an added layer of security, the login computer 12 may regenerate the encoded image 22 periodically. FIG. 5 illustrates a procedure 130 for encoded image regeneration. After the encoded image is generated and displayed (step 110) a timer is started (step 132). A check is performed to determine if vaulted credentials have been received before the timer expires (step 134). If the credentials have been received (meaning that steps 112-120 have occurred), then the login computer 12 proceeds to the automatic login (step 122). However, if the timer expires before the credentials have been received, the login computer 12 requests a new session ID from the password management server 14 (step 136), and upon a new session ID being received (step 138) step 110 is repeated. If no new session ID is received, then step 136 may be repeated. Steps 132-138 are all performed by the login computer 12. In one example the timer is set to a relatively short period of time (e.g., 30 seconds) so that new encoded images are generated frequently. Use of a shorter period of time can prevent spoofing efforts, as a copied encoded image would only be valid for a brief period of time.

Additionally, in one or more embodiments the encoded image generation may actually be performed by the password management server 14. In these embodiments, the login computer 12 would receive the encoded image for display from the password management server 14, instead of generating the encoded image itself.

Figure 6:
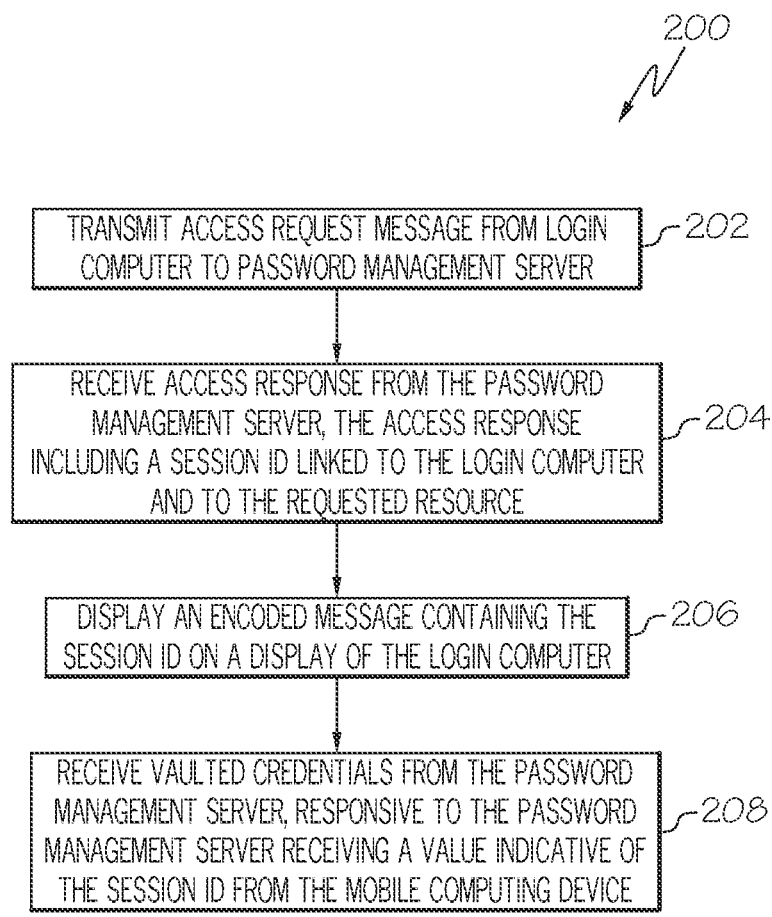
FIG. 6 illustrates a method implemented by a login computer to facilitate the release of vaulted credentials.

FIG. 6 illustrates a method 200 performed by login computer 12. An access request message is transmitted from the login computer 12 to the password management server 14 (step 202). The access request message identifies a requested resource and the login computer 12. The login computer 12 receives, responsive to the access request message, an access response from the password management server 14 (step 204). The access response includes a session ID linked to the login computer 12 and to the requested resource (e.g., shared "Administrator" account). An encoded image 22 containing the session ID is displayed to mobile computing device 16 via the electronic display 24 of the login computer 12 (step 206). The login computer 12 receives vaulted credentials from the password management server 14 responsive to the password management server 14 receiving a value indicative of the session ID, decoded from the encoded image, from the mobile computing device 16 (step 208).

Figure 7:
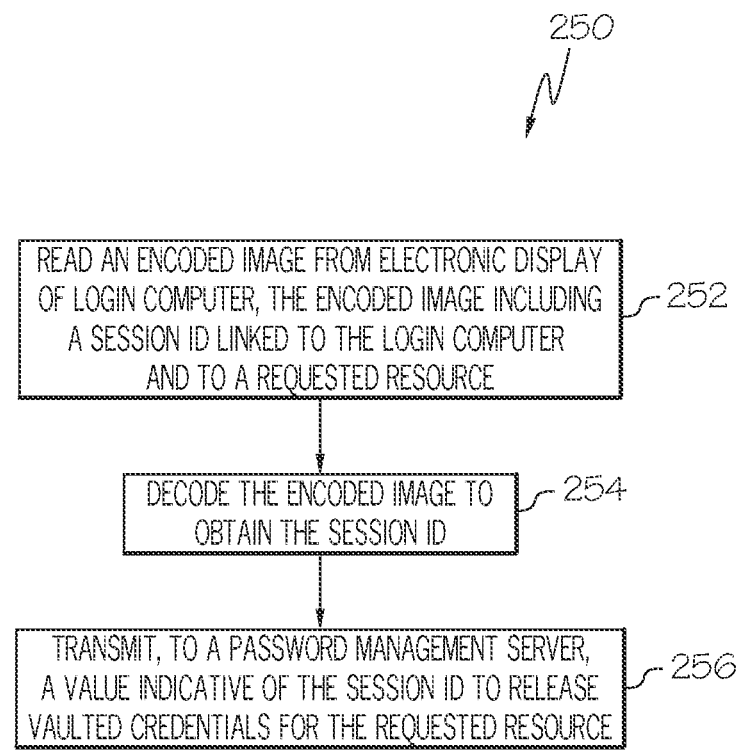
FIG. 7 illustrates a method implemented by a mobile computing device to facilitate the release of vaulted credentials.

FIG. 7 illustrates a method 250 performed by the mobile computing device 16. The mobile computing device 16 reads the encoded image 22 from the electronic display 24 of the login computer 12 (step 252). The encoded image including a session ID linked to the login computer 12 and to a requested resource (e.g., shared "Administrator" account). The mobile computing device 16 decodes the encoded image 22 to obtain the session ID (step 254). The mobile computing device 16 transmits, to the password management server 14, a value indicative of the session ID to release vaulted credentials for the requested resource to the login computer 12 (or in some embodiments to the mobile computing device) (step 256).

Figure 8:
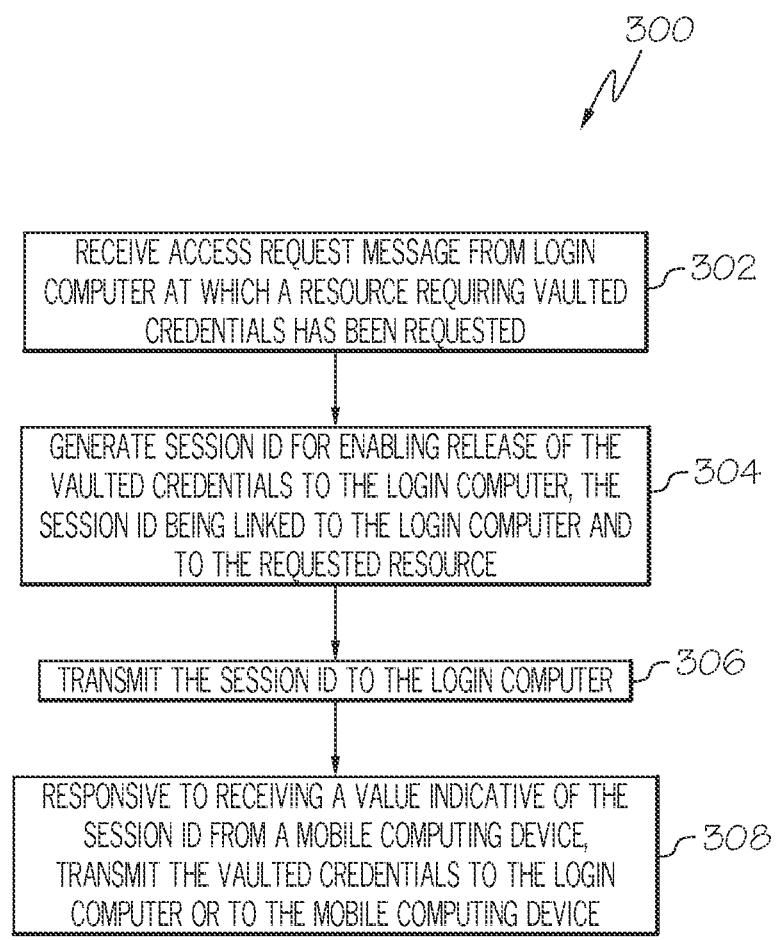
FIG. 8 illustrates a method implemented by a password management server to release vaulted credentials based on receipt of a session ID.

FIG. 8 illustrates a method performed by the password management server 14. The password management server 14 receives an access request message from the login computer 12 at which a resource requiring vaulted credentials has been requested (step 302). The access request message identifies the requested resource and the login computer 12. The password management server 14 generates a session ID for enabling release of the vaulted credentials to the login computer (step 304), with the session ID being linked to the login computer 14 and to the requested resource. The server transmits the session ID to the login computer 12 (step 306), and responsive to receiving a value indicative of the session ID from the mobile computing device 16, the server 14 transmits the vaulted credentials to the login computer 12 or to the mobile computing device (step 308).

In one or more embodiments, in step 308 the server 14 transmits the vaulted credentials to the login computer 12 if the login computer supports automatic login for the requested resource, and otherwise transmits the vaulted credentials to the mobile computing device 16 if the login computer 12 does not support automatic login for the requested resource. If the mobile computing device 16 receives the vaulted credentials, the mobile computing device 16 could then display the credentials so that they could be manually entered at the login computer 12 by the user 30.

Figure 9:
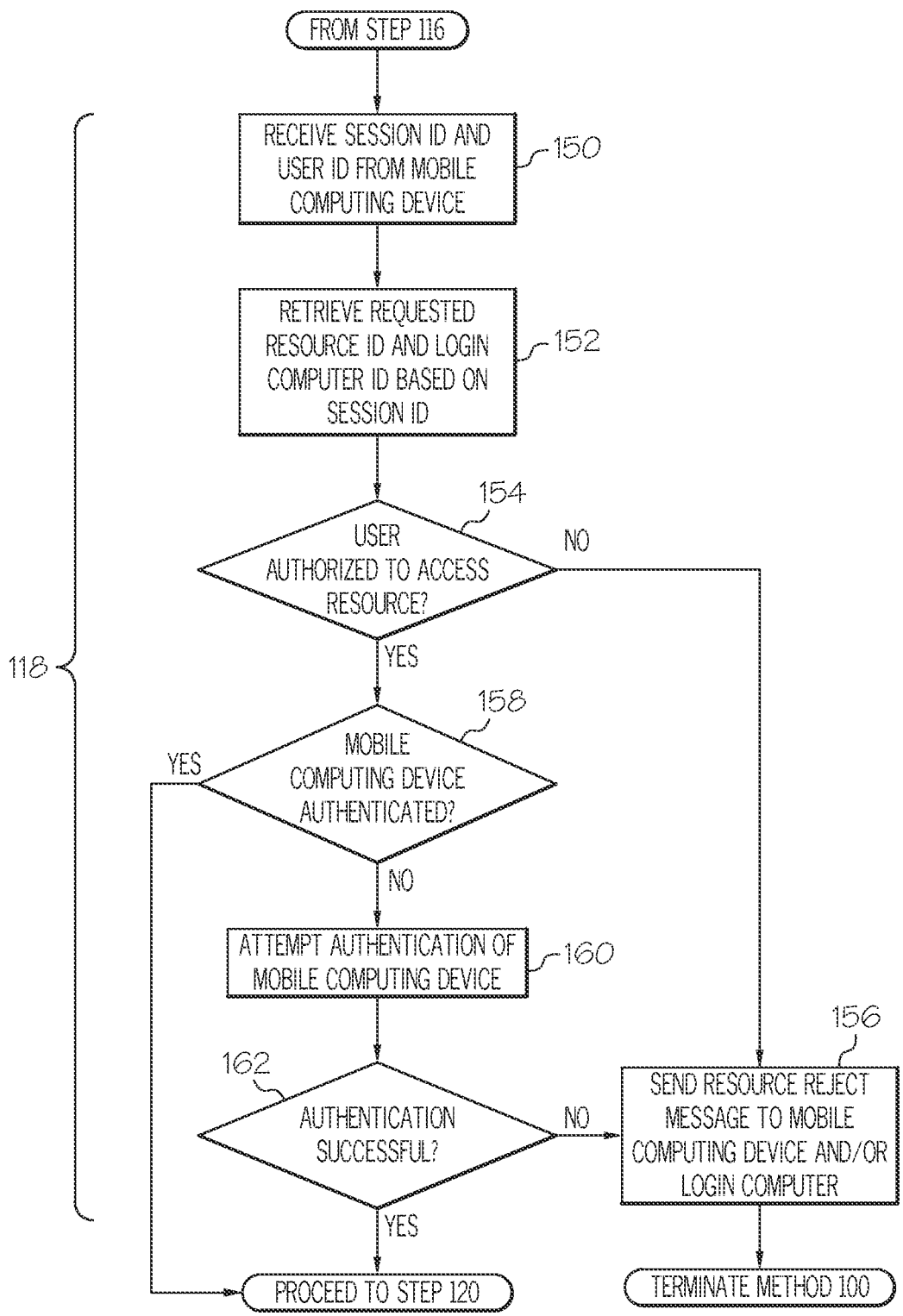
FIG. 9 illustrates an example vaulted credential checkout process including mobile computing device authentication.

In one or more embodiments the password management server 14 performs some authentication of the mobile computing device 16 before releasing the vaulted credentials. FIG. 9 illustrates the vaulted credential checkout 18 of FIG. 2 according to one example embodiment, in which mobile computing device authentication is performed. The password management server 14 receives the session ID and the user ID from the mobile computing device 16 (step 150). Based on the session ID, the password management server 14 retrieves the requested resource ID and login computer ID (step 152). The password management server 14 then checks to see if the requesting user (e.g., "Joe Smith") is authorized to access the requested resource, based on the received user ID (step 154). If the user is not permitted to access the requested resource, then the password management server 14 transmits a resource reject message to the mobile computing device 16 and/or to the login computer 12 indicating that vaulted credentials for the requested resource will not be released (step 156), and the method 100 of FIG. 2 is terminated However, if the requesting user is authorized to access the requested resource, then the password management server 14 determines if the mobile computing device 16 has been authenticated (step 158). This may be done based upon an IP address of the mobile computing device 16, or some other mobile computing device ID (e.g., one transmitted in step 116 and received in step 150). In one or more embodiments, step 158 involves the password management server 14 checking to see if the mobile computing device 16 has been authenticated with the password management server 14 for the requesting user. In one or more embodiments this includes the mobile computing device 16 transmitting a mobile computing device ID that has been preregistered with the password management server 14 as being associated with the user ID of the requesting user, and step 158 is a determination of whether that mobile device ID is currently authenticated. In one or more embodiments, the mobile computing device 16 may have to re-authenticate itself periodically with the password management server 14 (e.g., the user 30 may be required perform some authentication steps periodically to maintain the mobile computing device 16 being able to obtain vaulted credentials for the login computer 12). Such authentication could involve the mobile computing device 16 providing a username and password, one or more soft tokens, or biometric authentication data (e.g., retina scan, fingerprint scan, etc.) to the password management server 14 using an application executable by the mobile computing device 16.

If the mobile computing device 16 is authenticated, then the password management server 14 proceeds to step 120 (see FIG. 2). Otherwise, if the mobile computing device 16 is not authenticated, then authentication is attempted (step 160). This may include the password management server 14 requesting information from the mobile computing device 16, such as the items discussed above (e.g., username, password, soft tokens, biometric data, etc.). If authentication is unsuccessful and the mobile computing device 16 cannot be authenticated, the password management server 14 transmits the resource reject message of step 156 to the mobile computing device 16 and/or to the login computer 12 indicating that vaulted credentials for the requested resource will not be released (step 154), and the method 100 of FIG. 2 is terminated. However, if the authentication attempt (step 160) is successful and the mobile computing device is authenticated, then the password management server proceeds to step 120.

Figure 10:
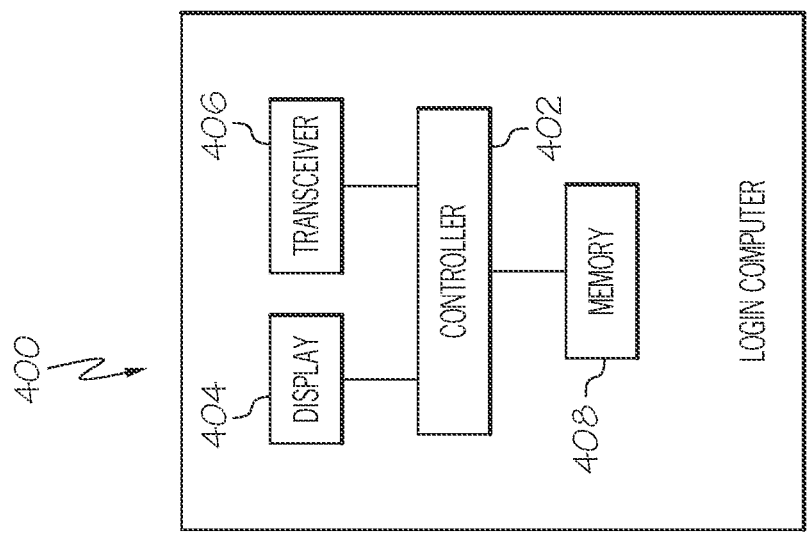
FIG. 10 illustrates an example login computer.

FIG. 10 illustrates an example login computer 400. The login computer 400 includes a controller 402 configured to transmit an access request message from the login computer 400 to a password management server (e.g., server 600 of FIG. 12), with the access request message identifying a requested resource and the login computer 400. The controller 402 is further configured to receive, responsive to the access request message, an access response from the password management server 600, the access response including a session ID linked to the login computer 400 and to the requested resource. An electronic display 404 is operatively connected to the login computer 400 and is configured to display an encoded image containing the session ID (see, e.g., the display 24 of FIG. 1) to a mobile computing device (e.g., mobile computing device 500 of FIG. 11). The controller 402 is further configured to receive vaulted credentials from the password management server 600 responsive to the password management server 600 receiving a value indicative of the session ID, decoded from the encoded image, from the mobile computing device 500. The login computer 400 also includes a transceiver 406 for communicating with the password management server 600, and memory 408 storing program code including instructions for performing the steps described above.

Figure 11:
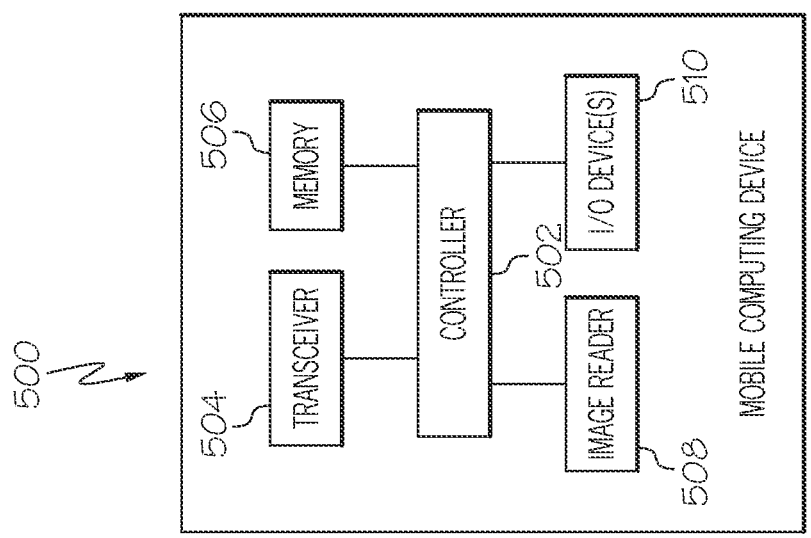
FIG. 11 illustrates an example mobile computing device.

FIG. 11 illustrates an example mobile computing device 500. The mobile computing device 500 includes a controller 502 that is configured to read the encoded image from the display 404 of the login computer 400. The encoded image includes a session ID linked to the login computer 400 and to the requested resource. The controller 502 is further configured to decode the encoded image to obtain the session ID. The mobile computing device 500 also includes a transceiver 504 configured to transmit, to a password management server (e.g., password management server 600 of FIG. 12), an indication of the session ID to facilitate release of the vaulted credentials for the requested resource to the login computer 400 or to the mobile computing device 500. The mobile computing device 500 also includes memory 506 storing program code including instructions for performing the steps described above, and includes an image reader 508 utilized by the controller 502 to read the encoded image. The image reader 508 may include a camera (e.g., a smartphone camera), or a bar code scanner, for example. The mobile computing device 500 also includes one or more input/output devices 510 (e.g., a touchscreen on a smartphone). The mobile computing device 500 exhibits some degree of portability for the user 30, and may be a device such as a laptop, tablet, smartphone, personal digital assistant (PDA), etc.

Figure 12:
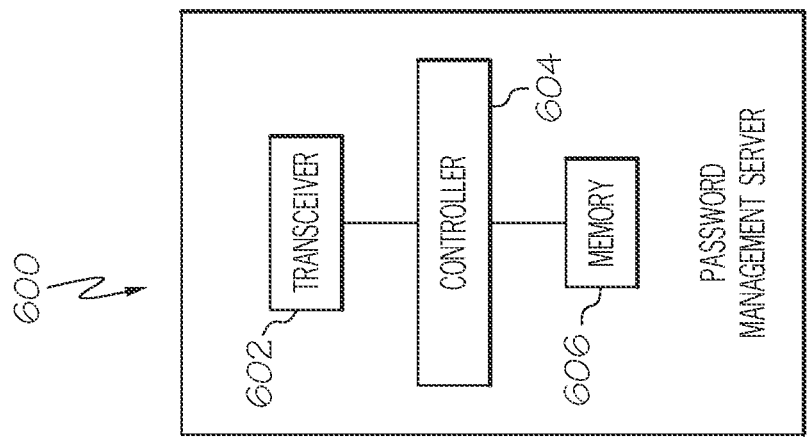
FIG. 12 illustrates an example password management server.

FIG. 12 illustrates an example password management server 600. The password management server 600 includes a transceiver 602 and a controller 604. The controller 604 is configured to receive, via the transceiver 602, an access request message from a login computer 400 at which a resource requiring vaulted credentials has been requested, the access request message identifying the requested resource and the login computer 400. The controller 604 is further configured to generate a session ID for enabling release of the vaulted credentials, the session ID being linked to the login computer 400 and to the requested resource. The server 600 is configured to transmit, via the transceiver 602, the session ID to the login computer 400. Responsive to receiving a value indicative of the session ID from a mobile computing device (e.g., device 500) via the transceiver 602, the controller 604 is configured to transmit the vaulted credentials to the login computer 400 or to the mobile computing device 500. The password management server 600 also includes memory 608 storing computer program code containing instructions for performing the steps described above, and storing vaulted credential information (e.g., actual vaulted credentials, or information used to dynamically generate vaulted credentials on demand).

The methods described above solve a number of problems in the prior art. One limitation of prior art PAPM systems was that they revealed credentials to a given user for the user to type into a login prompt, making it easy to share passwords and generally handle passwords in an unsecured manner (e.g., writing on slips of paper). The various embodiments discussed above in which a mobile computing device 16 is used to decode an encoded image 22, and where the password management server 14 provides vaulted credentials responsive to receiving a decoded value from the mobile computing device 16 can resolve this problem by transmitting the vaulted credentials to the login computer 12 without revealing them to the requesting user. By not divulging the vaulted credentials and by providing consistent identification information to each target machine, the security problems discussed above can be prevented. That is, by using the methods described above, in one or more embodiments password sharing can be prevented, because if credentials are not divulged to a user then the user cannot share them. Additionally, considerable time can be saved using the automatic login process as described above. Use of a mobile computing device 16 also provides some degree of convenience to the requesting user 30, since mobile computing devices are often carried on one's person, and if the mobile computing device 16 is a smartphone this removes the need to carry a larger secondary computer (e.g., a laptop) just to get vaulted credentials. Also, because credentials are checked out only when needed, they could be changed by the password management server 14 after every login.

Additionally, in prior art PAPM systems it was required to specify a machine name or some other network identification such as an Internet Protocol (IP) address when checking out vaulted credentials. This was problematic if a requesting user did not know the machine name. For example, if a system hosted in private cloud determines that it needs more resources, (e.g., more virtual machines) to accommodate load, then virtual machines may be cloned in the cloud, resulting in machines that have different IP addresses, different names, etc.—all of which may be unknown to a user. Thus, the user might not be aware of the machine name or IP address when looking at the machine's login screen. The methods described above can be used to solve this problem, as the user would not need to be aware of the virtual machine name or IP address to obtain vaulted credentials for the virtual machine. As another example, the methods described above would be useful for a user utilizing virtual machines running in hosted environments, where the user is required to know which virtual machine images to login to for performing maintenance tasks, but does not know the virtual machine name or privileged account credentials. Thus, in one or more embodiments, the user 30 is able to login with a privileged account to obtain access to a requested resource (e.g., a shared account in a managed system) without being exposed to the privileged account credentials, and without even knowing the identification properties of the system they are accessing. The methods described above solve this problem because the requesting user 30 does not need to know such information (as it will automatically be provided when the login computer 12 transmits its access request to the password management server 14). Moreover, if automatic login is supported by the login computer 12, the user 30 does not need to know the vaulted credentials at all.

The present embodiments may, of course, be carried out in other ways than those specifically set forth herein without departing from essential characteristics of the disclosure. For example, it should be noted that the flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
receiving, at a password management server, an access request message from a login computer at which a resource requiring vaulted credentials has been requested, the access request message identifying the requested resource and the login computer;
generating a session identifier (ID) for enabling release of the vaulted credentials, the session ID being linked to the login computer and to the requested resource;
transmitting the session ID to the login computer; and
responsive to receiving a value indicative of the session ID from a mobile computing device, transmitting the vaulted credentials to the login computer or to the mobile computing device.

2. The method of claim 1, wherein said transmitting the session ID comprises transmitting an encoded image containing the session ID.

3. The method of claim 1, wherein transmitting the vaulted credentials to the login computer or to the mobile computing device comprises:
transmitting the vaulted credentials to the login computer if the login computer supports automatic login to the requested resource; and
transmitting the vaulted credentials to the mobile computing device if the login computer does not support automatic login to the requested resource.

4. A computer-implemented method comprising:
transmitting an access request message from a login computer to a password management server, the access request message identifying a requested resource and the login computer;
receiving, responsive to the access request message, an access response from the password management server, the access response including a session identifier (ID) linked to the login computer and to the requested resource;
displaying an encoded image containing the session ID to a mobile computing device via a display of the login computer; and receiving vaulted credentials from the password management server responsive to the password management server receiving a value indicative of the session ID, decoded from the encoded image, from the mobile computing device.

5. The method of claim 4, further comprising:
performing, by the login computer, an automatic login using the vaulted credentials received from the password management server to obtain access to the requested resource.

6. The method of claim 4, further comprising:
generating, by the login computer, the encoded image containing the session ID.

7. The method of claim 6, wherein said generating the encoded image is repeated to generate a different encoded image for display responsive to a predetermined time period transpiring after display of the encoded image without receiving the vaulted credentials from the password management server.

8. The method of claim 4, further comprising:
receiving, at the login computer, the encoded image containing the session ID from the password management server.

9. The method of claim 4, wherein the encoded image includes at least one of a Quick Response (QR) code and a bar code.

10. A computer-implemented method comprising:
reading, by a mobile computing device, an encoded image from an electronic display of a login computer, the encoded image including a session identifier (ID) linked to the login computer and to a requested resource;
decoding, by the mobile computing device, the encoded image to obtain the session ID; and
transmitting, from the mobile computing device to a password management server, a value indicative of the session ID to release vaulted credentials for the requested resource to the login computer or to the mobile computing device.

11. The method of claim 10, wherein said reading the encoded image using a mobile computing device comprises recording a copy of the encoded image via a camera of the mobile computing device.

12. A computing device comprising:
a transceiver in a password management server, and
a controller in the password management server, the controller being configured to:
receive, via the transceiver, an access request message from a login computer at which a resource requiring vaulted credentials has been requested, the access request message identifying the requested resource and the login computer;
generate a session identifier (ID) for enabling release of the vaulted credentials, the session ID being linked to the login computer and to the requested resource;
transmit, via the transceiver, the session ID to the login computer; and
responsive to receiving, via the transceiver, a value indicative of the session ID from a mobile computing device, transmit the vaulted credentials to the login computer or to the mobile computing device.

13. The computing device of claim 12, wherein the controller is configured to transmit the session ID by transmitting, via the transceiver, an encoded image containing the session ID.

14. The computing device of claim 12, wherein the controller is configured to transmit the vaulted credentials to the login computer or to the mobile computing device by being configured to:
transmit the vaulted credentials to the login computer if the login computer supports automatic login to the requested resource; and
transmit the vaulted credentials to the mobile computing device if the login computer does not support automatic login to the requested resource.

15. A computing device comprising:
a controller in a login computer, the controller being configured to:
transmit an access request message from the login computer to a password management server, the access request message identifying a requested resource and the login computer; and
receive, responsive to the access request message, an access response from the password management server, the access response including a session identifier (ID) linked to the login computer and to the requested resource; and
a display operatively connected to the login computer and configured to display an encoded image containing the session ID to a mobile computing device;
wherein the controller is further configured to:
receive vaulted credentials from the password management server responsive to the password management server receiving a value indicative of the session ID, decoded from the encoded image, from the mobile computing device.

16. The computing device of claim 15, wherein the controller is further configured to:
perform an automatic login using the vaulted credentials received from the password management server to obtain access to the requested resource.

17. The computing device of claim 15, wherein the controller is further configured to:
generate the encoded image containing the session ID.

18. The computing device of claim 17, wherein the controller is configured to repeat the generation of the encoded image to generate a different encoded image for display responsive to a predetermined time period transpiring after display of the encoded image without receiving the vaulted credentials from the password management server.

19. The computing device of claim 15, wherein the controller is further configured to:
receive the encoded image containing the session ID from the password management server.

20. The computing device of claim 15, wherein the encoded image includes at least one of a Quick Response (QR) code and a bar code.

21. A computing device comprising:
a controller in a mobile computing device, the controller being configured to:
read an encoded image from an electronic display of a login computer, the encoded image including a session identifier (ID) linked to the login computer and to a requested resource; and
decode the encoded image to obtain the session ID; and
a transceiver configured to:
transmit, from the mobile computing device to a password management server, a value indicative of the session ID to release vaulted credentials for the requested resource to the login computer or to the mobile computing device.

22. The computing device of claim 21, further comprising: a camera configured to record a copy of the encoded image for decoding by the controller.

23. A computer program product comprising:
a non-transitory computer readable storage medium having computer readable program code embodied therewith for a password management server, the computer readable program code comprising:
computer readable program code configured to receive, at the password management server, an access request message from a login computer at which a resource requiring vaulted credentials has been requested, the access request message identifying the requested resource and the login computer;
computer readable program code configured to generate a session identifier (ID) for enabling release of the vaulted credentials, the session ID being linked to the login computer and to the requested resource;
computer readable program code configured to transmit the session ID to the login computer; and
computer readable program code configured to, responsive to receiving a value indicative of the session ID from a mobile computing device, transmit the vaulted credentials to the login computer or to the mobile computing device.

24. The computer program product of claim 23, wherein the computer readable program code configured to transmit the session ID to the login computer comprises:
computer readable program code configured to transmit an encoded image containing the session ID to the login computer.

25. The computer program product of claim 23, wherein the computer readable program code configured to transmit the vaulted credentials to the login computer or to the mobile computing device comprises:
computer readable program code configured to transmit the vaulted credentials to the login computer if the login computer supports automatic login to the requested resource; and
computer readable program code configured to transmit the vaulted credentials to the mobile computing device if the login computer does not support automatic login to the requested resource.

26. A computer program product comprising:
a non-transitory computer readable storage medium having computer readable program code embodied therewith for a login computer, the computer readable program code comprising:
computer readable program code configured to transmit an access request message from the login computer to a password management server, the access request message identifying a requested resource and the login computer;
computer readable program code configured to receive, responsive to the access request message, an access response from the password management server, the access response including a session identifier (ID) linked to the login computer and to the requested resource;
computer readable program code configured to display an encoded image containing the session ID to a mobile computing device via a display of the login computer; and
computer readable program code configured to receive vaulted credentials from the password management server responsive to the password management server receiving a value indicative of the session ID, decoded from the encoded image, from the mobile computing device.

27. The computer program product of claim 26, wherein the computer readable storage medium further comprises:
computer readable program code configured to perform, by the login computer, an automatic login using the vaulted credentials received from the password management server to obtain access to the requested resource.

28. The computer program product of claim 26, wherein the computer readable storage medium further comprises:
computer readable program code configured to generate, by the login computer, the encoded image containing the session ID.

29. The computer program product of claim 28, wherein computer readable storage medium further comprises:
computer readable program code configured to repeat the generating of the encoded image to generate a different encoded image for display responsive to a predetermined time period transpiring after display of the encoded image without receiving the vaulted credentials from the password management server.

30. The computer program product of claim 26, wherein the computer readable storage medium further comprises:
computer readable program code configured to receive, at the login computer, the encoded image containing the session ID from the password management server.

31. The computer program product of claim 26, wherein the encoded image includes at least one of a Quick Response (QR) code and a bar code.

32. A computer program product comprising:
a non-transitory computer readable storage medium having computer readable program code embodied therewith for a mobile computing device, the computer readable program code comprising:
computer readable program code configured to read an encoded image from an electronic display of a login computer, the encoded image including a session identifier (ID) linked to the login computer and to a requested resource;
computer readable program code configured to decode, by the mobile computing device, the encoded image to obtain the session ID; and
computer readable program code configured to transmit, from the mobile computing device to the password management server, a value indicative of the session ID to release vaulted credentials for the requested resource to the login computer or to the mobile computing device.

33. The computer program product of claim 32, wherein the computer readable program code further comprises computer readable program code configured to record a copy of the encoded image via a camera of the mobile computing device.

* * * * *